United States Patent [19]

Smith

[11] Patent Number: 4,987,666
[45] Date of Patent: Jan. 29, 1991

[54] METHOD OF MAKING COVERS FOR FOAM BODIES USING A SEAM STABILIZER

[75] Inventor: Sandra L. Smith, Pontiac, Mich.

[73] Assignee: Hoover Universal, Inc., Plymouth, Mich.

[21] Appl. No.: 480,314

[22] Filed: Feb. 15, 1990

[51] Int. Cl.⁵ ............................................... B68G 7/00
[52] U.S. Cl. ..................................... 29/91.1; 264/45.1; 264/46.8
[58] Field of Search .............. 29/91.1; 264/45.1, 46.4, 264/46.6, 46.7, 46.8

[56] References Cited

U.S. PATENT DOCUMENTS

| | | | |
|---|---|---|---|
| 3,161,436 | 12/1964 | Hood | 264/46.7 |
| 3,971,112 | 7/1976 | Amato et al. | 29/91.1 |
| 4,542,887 | 9/1985 | Bethell et al. | 264/46.4 |
| 4,829,644 | 5/1989 | Kondo et al. | 29/91.1 |
| 4,860,415 | 8/1989 | Witzke | 29/91.1 |

Primary Examiner—Howard N. Goldberg
Assistant Examiner—D. Cuda
Attorney, Agent, or Firm—Harness, Dickey & Pierce

[57] ABSTRACT

A tear away seam stabilizer for a vehicle seat component is provided for use with the pour-in-place molding process. The stabilizer, or welt, has an annular body attached to a notched tab portion by a tapered portion and neck portion which is sewn between covering members to form the desired shape of a component. A mold is provided within which the sewn cover, with the seam stabilizers in place, is inserted. The stabilizers maintain alignment of the seams in the cover member during the pour-in-place process and also prevent wrinkles in the cover. The end result is a vehicle seat component with the cover member tightly adhered to the foam body and conforming to a surface of predetermined shape. Once the foam pad is adhered to the cover member, the annular body of the stabilizer is readily torn off.

8 Claims, 3 Drawing Sheets

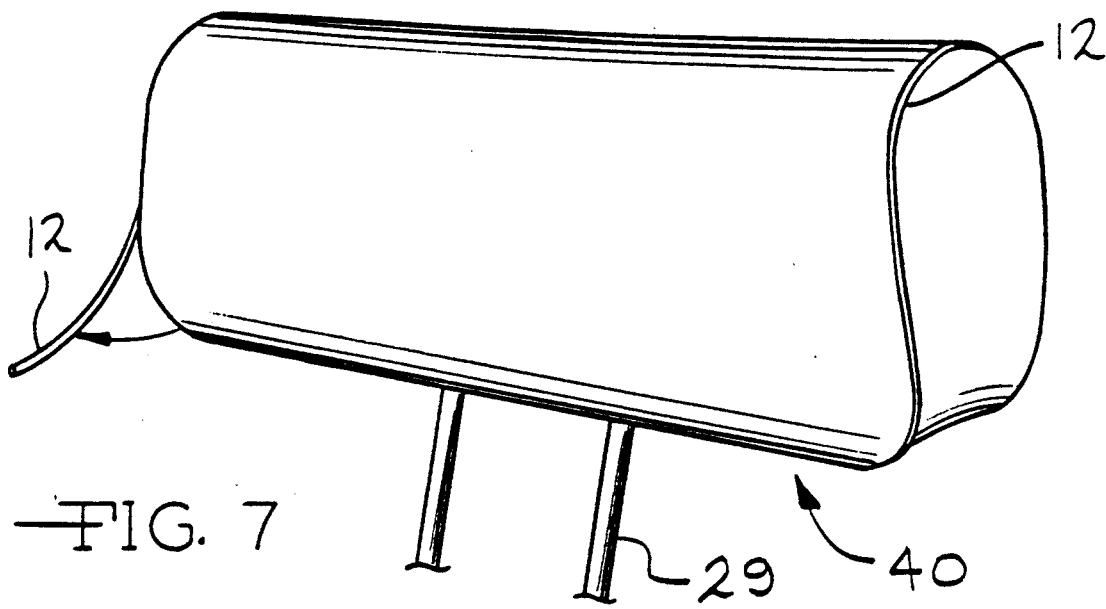
FIG. 7
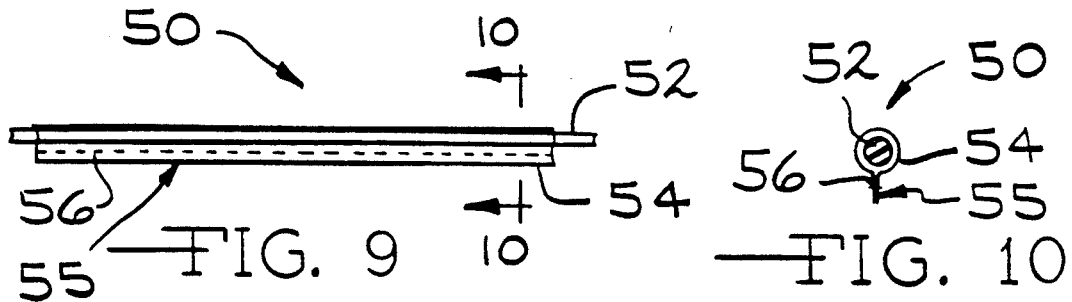
FIG. 9
FIG. 10
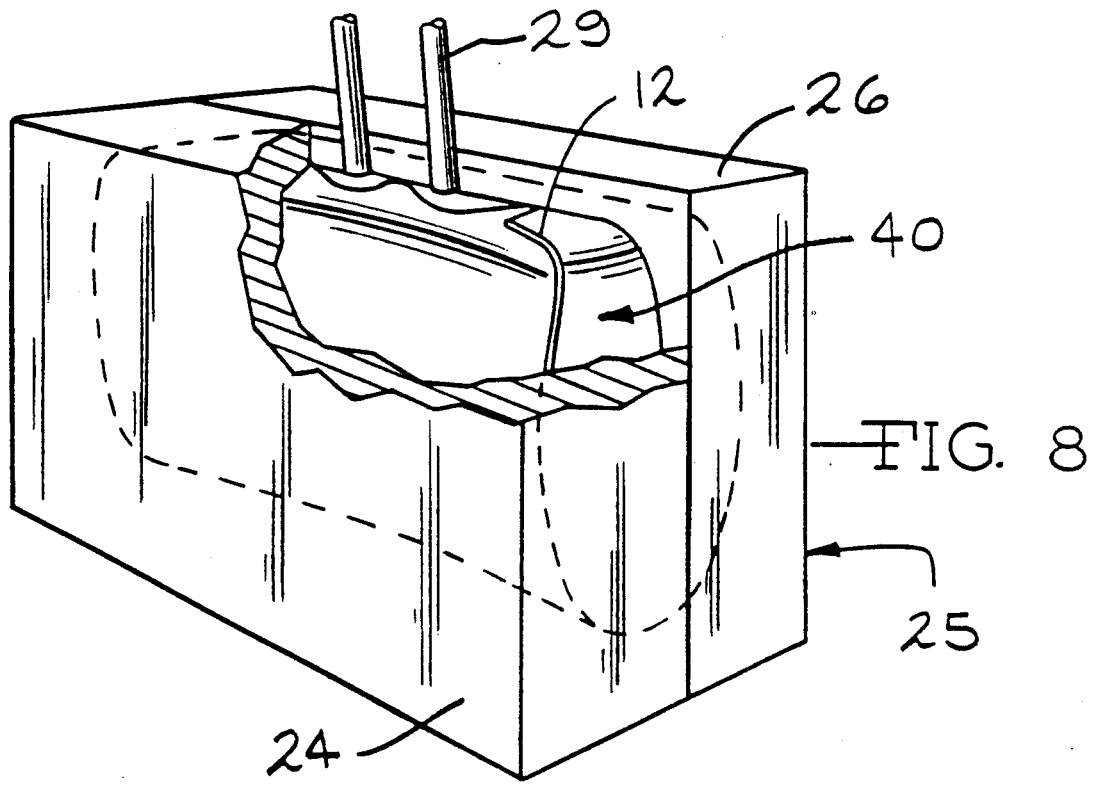
FIG. 8

METHOD OF MAKING COVERS FOR FOAM BODIES USING A SEAM STABILIZER

BACKGROUND AND SUMMARY OF THE INVENTION

This invention relates generally to covers for foam parts of vehicle seat assemblies, such as the seat members and headrests, and more particularly to such foam parts which are improved from the standpoints of comfort and appearance by virtue of the use of the seam stabilizers of this invention in the covers for these parts.

It is a desirable objective in seating of all types, particularly vehicle seating, to provide seat components with covering materials which conform tightly to the surface of the foam pads. Such seat members are desirably formed with an interior load support section bounded by peripheral sections that function as bolsters to impart a feeling of stability and comfort to the occupant of the seat. The interior sections should further include a contoured surface to enhance the seat cushion's appearance and occupant's comfort. In order to accomplish this, the present invention utilizes separate covering members to cover the interior section and the peripheral sections of the seat member. The separate covering members are secured in place by the attachment of these members to a tear away welt, or trim strip, which is integrated into a seam at the juncture of the sections, thereby stabilizing the seam and preventing wrinkling of the cover during the pour-in-place molding process of the foam pad.

Tear away welts have previously been used in the manufacture of vehicle seats, as shown by U.S. Pat. No. 4,765,045, assigned to the assignee of this application. However, the welt shown in the patent is for seam locating purposes, not seam stabilizing.

The above mentioned patent teaches the use of the welt to position the covering material on a mold and subsequently on a pre-shaped pad. In the present invention, the welt is not secured to the mold and a pre-shaped foam pad is not required. Rather, a pour-in-place process is used to form the foam pad. There are several benefits from using the pour-in-place process to mold the foam pad instead of using a pre-shaped pad. For example, the overall production cost is lower since the step of attaching the foam pad to the cover is eliminated. Additionally, the difficulties associated with aligning a pre-shaped pad with a shaped cover are nonexistent in the pour-in-place process, thereby resulting in a better fitting cover and a faster production process.

The tear away welt of this invention is preferably molded of bendable plastic material, however, other materials providing sufficient rigidity may also be used. Initially, the welt is sewn into the covering members at their junctures, so as to stabilize the resulting seams and insure that the seam will maintain the desired shapes. A first mold member supports the covering members, and the welt, prior to molding of the foam pad. A second mold member is then positioned above the first mold member and a liquid foam material is injected into the mold cavity onto the cover members to form the foam pad to the cover assembly. The tear away welt provides accurate location of the covering members in the mold during the injection of the liquid foam material and also prevents the seam from moving and being out of alignment.

The above mentioned welt has an annular body, positioned outside the seat component during assembly, and a notched tab portion, remaining within the seated component after assembly. At the juncture of the notched tab portion with the annular body, the welt is tapered to a reduced thickness to facilitate sewing and tearing.

Once the foam pad has been poured and formed within the mold, the covering members become adhered to the foam pad. The covering members and foam pad are then removed from the mold and the annular body portion of the tear away welt strip may be removed, if desired, by tearing it away from the notched tab portion. The result is a vehicle seat component in which the covering members are tightly adhered to the foam pad and conformed to the surface irregularities and designs of the foam pad. If desired, the interior and peripheral covering members can be formed of contrasting materials since different covering members are used in covering foam parts with this invention.

The result is an apparatus and a process that is improved from the standpoints of reliability in quality assurance and a seat product that is improved from the standpoints of appearance and comfort.

BRIEF DESCRIPTION OF THE DRAWINGS

Further objects, features and advantages of the invention will become apparent from the consideration of the following description, the appended claims and accompanying drawings in which:

FIG. 7 is a perspective view of another seat member, a head rest, with the tear away welt of the present invention being removed;

FIG. 8 is a partially cut away perspective view of the mold with the cover materials, welts and injected foam material assembled into a head rest seat member;

FIG. 9 is an elevational side view of another embodiment of the tear away welt of the present invention; and FIG. 10 is a cross-sectional view taken generally along lines 10—10 in FIG. 9 of one embodiment of the tear away welt of the present invention.

DETAILED DESCRIPTION OF THE PREFERRED EMBODIMENT

Figure 1:
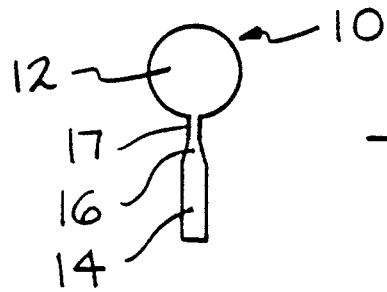
FIG. 1 is an enlarged elevational view of the tear away seam stabilizing welt of this invention.
Figure 2:
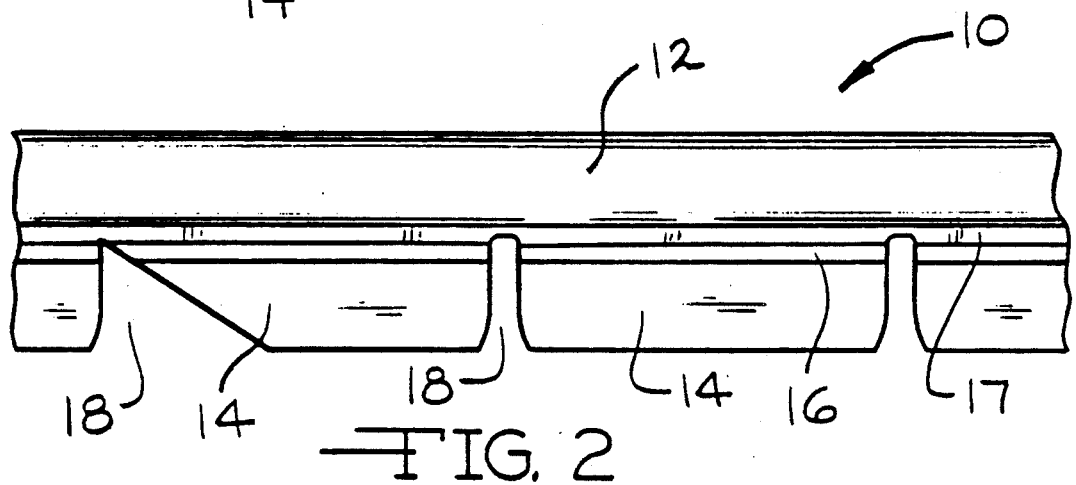
FIG. 2 is an enlarged fragmentary side view of the tear away welt shown in FIG. 1.

With reference to the drawings, the tear away welt of the claimed invention is shown in FIGS. 1 and 2 and generally designated 10. The welt 10 has an elongated annular body portion 12 connected to an elongated tab portion 14 through a tapered portion 16 and a neck portion 17. The tapered portion 16 and neck portion 17 allow seat cover portions 20 to be secured together and the annular body 12 to be removed from the tab portion 14 during final assembly, as discussed in detail below. The tab portion 14 also has notched portions 18 to increase flexibility of the welt 10.

Figure 3:
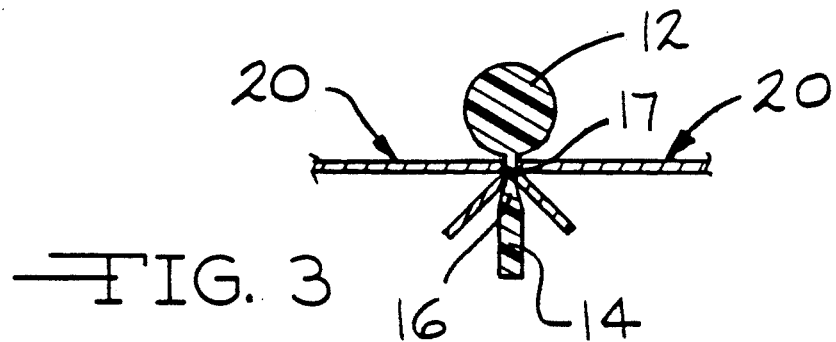
FIG. 3 is an enlarged sectional view of the tear away welt attached to the cover members.

A seat member component of the present invention is manufactured in the following manner. The seat cover portions 20 and 20 are sewn or otherwise secured together through the welt 10 at the neck portion 17, as shown in FIG. 3. Once all of the seat covering portions 20 are sewn together, a unitary seat covering member 22 is formed with welts 10 located at the junctions or seams of the cover portions 20. The cover member 22 can be formed of any fabric or other material used to cover seats. It is to be understood that the unitary seat covering member 22 can be substantially any shape desired for the seat member, regardless of whether that seat member is a seat cushion, seat back, head rest, arm holster or other trim assembly.

In the preferred embodiment, the seat cover 22 has an interior load support section 28 and an outer section 30 which extends around the periphery of the interior section 28. The sides of the outer section 30 function as bolsters and the front (not shown) functions as a thigh support and extends between the forward ends of the bolsters. The interior section 28 is contoured to provide a plurality of supports 32 which perform the double function of improving the appearance of the seat and sectionalizing the foam pad 36 for improved comfort purposes. If desired, the juncture of the supports 32 could also be defined by welts 10.

The foam pad 36 of the present invention is manufactured using the pour-in-place method, as disclosed in U.S. Pat. No. 4,860,415 filed June 13, 1988, which is hereby incorporated by reference. The pour-in-place method utilizes a mold member 25 having first and second members 24 and 26 forming a mold cavity therebetween. The first mold member 24 defines the load engaging surface of the foam pad 36 and corresponds to the load engaging surface 28 of the seat cover member 22.

Figure 4:
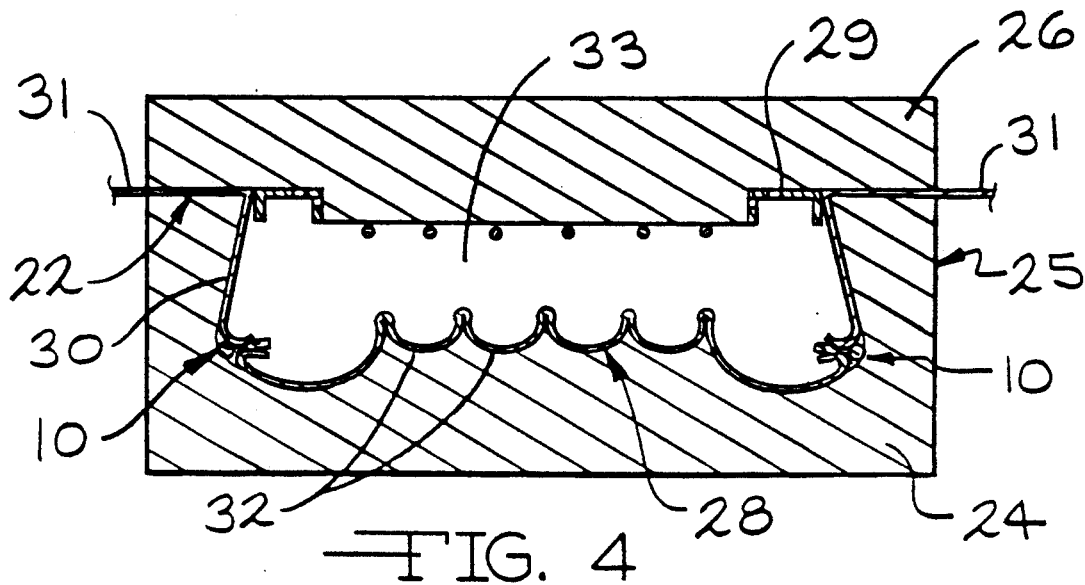
FIG. 4 is a transverse sectional view of the mold with the cover materials and welt assembled.

After forming the seat cover member 22 by securing the cover portions 20 to the welts 10, the cover member 22 is placed in the first mold member 24 as shown in FIG. 4. The edges 31 of the cover member 22 extends beyond the cavity 33 of the mold member 25. A seat support frame 29 is mounted in the second mold member 26. Alternatively, the support frame 20 could also be assembled into the seat member at a later time.

The second mold member 26 is then lowered into position above the first mold member 24, as shown in FIG. 4, with the free edges 31 of the cover member 22 extending beyond the mold 25. In this position, the support frame 29 is spaced apart from the cover member 22 forming a foaming cavity 33 therebetween. An expandable liquid foam material is injected into the foaming cavity 33 and onto the cover member 22 through an opening (not shown) in the mold member 25. In so doing, a foam pad 36 is molded which is integrally bonded to the seat cover member 22 and has embedded therein a portion of the support frame 29. Without the welts 10 located within the cover member 22, the juncture of the cover members 20 and 20 would have a tendency to shift during this pour-in-place process. Therefore, the welt 10 ensures that the cover member 22 will have straight seams for further visual enhancement of the seat member. FIG. 8 displays an analogous mold configuration for forming a head rest and is designated with like references.

Figure 5:
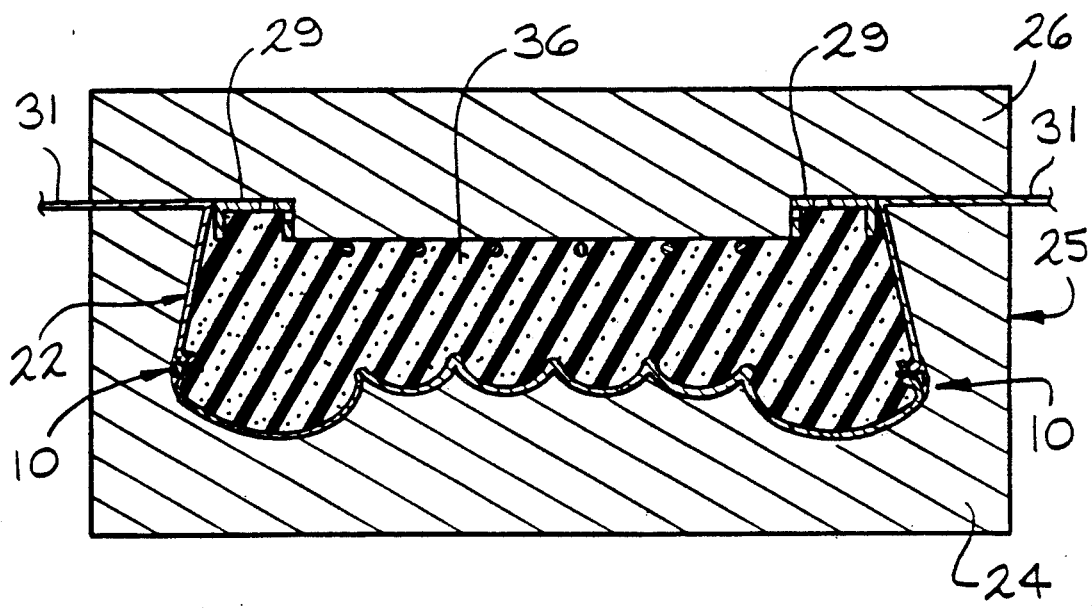
FIG. 5 is a transverse sectional view of the mold with the cover materials, welt and injected foam material assembled.
Figure 6:
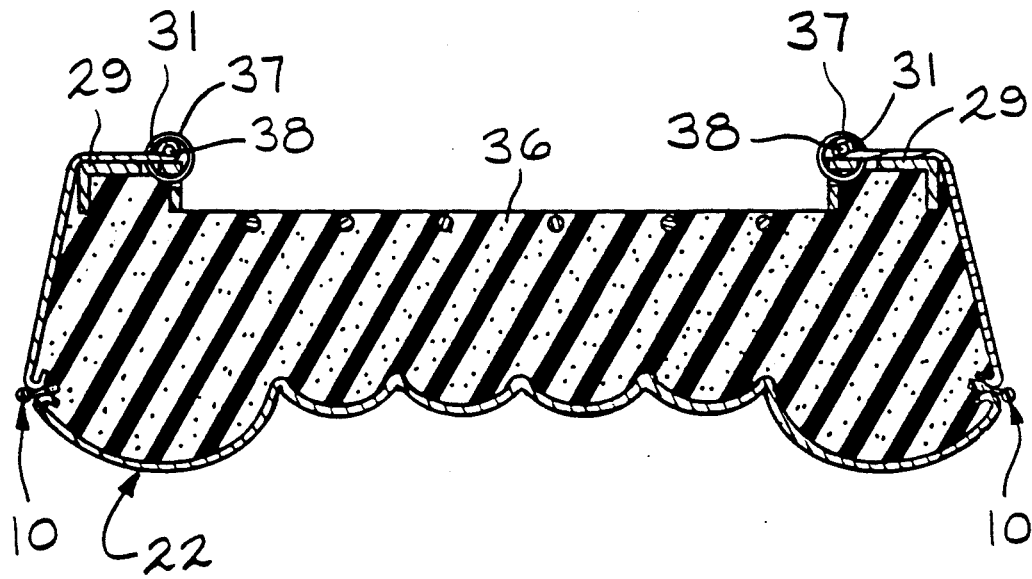
FIG. 6 is a transverse sectional view of a seat member incorporating the tear away welt of this invention after final assembly.

FIG. 5 shows the assembly comprising the foam pad 36 having a portion of its support frame 29 embedded therein and having the seat cover member 22 bonded thereto. After a brief period, the cover member 22 is firmly adhered to the pad surface so that the pad 36, with the cover member 22 thereon, can be removed from the mold 25 and the free edges 31 of the cover member 22 can be secured in any desired manner to the foam pad 36, such as hog rings 37 extending around the support frame 29 and retaining wires 38 embedded in the edges 31 of the cover member 22.

As stated earlier, the tear away welt 10 has an annular body portion 12, neck portion 17 tapered portion 16 and tab portion 14, secured at the juncture of the cover portions 20. The annular body 12 can be readily torn from a finished seat component 40 by simply grasping the welt 10 and manually removing the body portion 12 from the tab portion 14. FIG. 7 shows the annular body 12 being torn away from a finished seat component 40, a head rest. The elongated tab portion 14 remains hidden from view in the finished seat component 40.

Another embodiment of the present invention is shown in FIG. 9 and FIG. 10. A tear away welt 50 has an annular body 52 circumferentially enclosed in thin plastic sheeting 54. The sheeting 54 is secured around the annular body 52 by stitching 56, or other suitable fastening means, forming an elongated tab portion 55. Cover members 20 and 20 are then sewn or otherwise secured together through the welt 50 along the stitching 56 line to form a unitary cover 22. The seat component is then constructed according to the method previously described.

From the above description it is seen that this invention provides a vehicle seat component having interconnected cushion and covering members which are formed to enhance comfort of the occupant and appearance of this seat. If desired, the interior section and peripheral sections of the cover can be formed of contrasting materials or contrasting colors to further enhance the appearance of the seat member.

I claim:

1. The method of manufacturing a composite component of a seat assembly consisting of a foam body having a predetermined shape and a cover member for said body having welts secured therein, said welts having a tear away body portion connected to a tab portion, said method comprising the steps of:
   (a) shaping said cover member with said welts secured therein to said predetermined shape of said foam body;
   (b) providing a mold member corresponding to said predetermined shape;
   (c) molding said foam body in place upon said cover member by pouring in place an expandable liquid foaming material within said mold member in such a manner that said foam body is bonded to said cover member and conforms in shape to said predetermined shape; and
   (d) removing said body portions of said welts to form said seat component.

2. The method of claim 1, wherein said cover member comprises an interior section, and outer sections on transversely opposite sides of said interior section, said welts being secured to said sections at the juncture of said interior section with said outer sections.

3. The method of claim 2 wherein said cover member is formed by the steps of:
   (a) forming a first covering member of a size to cover a portion of said foam body corresponding to said interior section of said cover member;

(b) forming second covering members of a size to cover portions of said foam body corresponding to said outer sections of said cover member; and (c) securing said welt between peripheral edges of said first member and corresponding edges of the second members to form said cover member.

4. The method according to claim 1, wherein said welt is formed of a bendable plastic material with a reduced thickness section to enable tearing and facilitate removal of said welt body portions.

5. The method according to claim 1, wherein said welt comprises an annular body being removable from said seat component and a notched tab portion which remains with said seat component enabling tearing of said welt and facilitating removal of said annular body.

6. The method according to claim 1, wherein said covering members are secured to said welt by sewing.

7. The method of forming a component portion of a vehicle seat assembly utilizing a foam pad, a component support frame, a cover including at least two members having inner and outer sides, and a welt secured between at least two of said cover members, comprising the steps of:

(a) positioning said cover members and said welt within a first mold member having a shape complementary to a predetermined shape such that said inner side of said cover members is exposed within said first mold member, the edges of said cover members extending beyond said lower mold member;

(b) mounting said component support frame to a second mold member;

(c) placing said second mold member over said first mold member thereby creating a foaming cavity between said cover members, said second mold member and said component support frame;

(d) injecting an expandable liquid foaming material into said foaming cavity to mold said foam pad in such a manner that said foam pad is bonded to said inner side of said cover members and encapsulating a portion of said welts and said component support frame;

(e) removing said foam pad with said cover members bonded thereto and said component support frame partially encapsulated therein from said mold members; and (f) attaching said edges of said cover members to said component support frame.

8. The method according to claim 7 further including the step of removing all of said welt except said portions secured to said cover members and encapsulated within said foam pad.

* * * * *